United States Patent

[11] 3,608,074

| [72] | Inventors | Yves Rocher<br>41 Ave. Foch, Paris, France; |
|------|-----------|---------------------------------------------|
| [21] | Appl. No. | 709,494 |
| [22] | Filed | Feb. 29, 1968 |
| [23] | | Division of Ser. No. 431,710, Feb. 10, 1965, Pat. No. 3,464,972 |
| [45] | Patented | Sept. 21, 1971 |

[54] PHARMACEUTICAL COMPOSITIONS AND METHOD OF MAKING THE SAME
2 Claims, No Drawings

[52] U.S. Cl. .................................................. 424/195
[51] Int. Cl. .................................................. A61k 27/00
[50] Field of Search ...................................... 424/195;

[56] References Cited
UNITED STATES PATENTS

| 2,432,217 | 12/1947 | Thompson..................... | 260/210.5 |
| 2,615,016 | 10/1952 | Schencds et al ............. | 260/210.5 |
| 2,790,793 | 4/1955 | Boedecker .................... | 260/210.5 |
| 2,715,122 | 8/1955 | Rolhiner et al. ............... | 260/210.5 |

*Primary Examiner*—Stanley J. Friedman
*Attorneys*—Waters, Roditi, Schwartz & Nissen ABSTRACT: Humans afflicted with hemorrhoids or rosacea are treated by topical application of an ointment comprising as the active ingredients, pure saponins obtained from the root of *Ficaria ranunculus*.

PHARMACEUTICAL COMPOSITIONS AND METHOD OF MAKING THE SAME

This application is a division of Ser. No. 431,710, filed Feb. 10, 1965, which is now Pat. No. 3,464,972.

This invention relates to pharmaceutical compositions having appreciable physiological activity as anticongestive and vasoconstrictive agents which are more particularly of use in the treatment of hemorrhoids and rosacea.

It is well known that the properties of the root of the lesser colandine (*ranunculus Ficaria*) have long been recognized and recommended for the treatment of hemorrhoids. Infusions and/or decoctions of ficaria roots are generally used for this purpose, and the remedy is well known in folk medicine.

These properties had heretofore been observed only empirically and it was not possible to obtain a stable product of high and constant activity in a small volume by a reproducible process form the natural raw material formed by the plant.

An object of the present invention is, therefore, the provision of a method of producing a total ficaria extract, which can be more readily handled than the root infusion, the activity of which is of the same type, but whose main advantage is a much greater degree of activity which can be quantitatively estimated.

The invention also relates to the extracts produced by this method, containing the same active substances as the natural raw material, namely saponins, and qualitatively having a pharmacodynamic action similar to that of ficaria root, and also valuable properties for human medicine.

The process according to which the extract is obtained comprises a succession of well-defined steps resulting in the production of saponins in the pure state by the successive elimination of impurities and foreign constituents resulting from an initial aqueous or alcohol extraction of the ficaria root. This succession of steps comprises firstly extracting the root by boiling same with a hydroxyl-group-containing solvent, dying the extract, then boiling the resultant dry extract with a liquid hydrocarbon in order to eliminate resins, followed by boiling the resultant insoluble substances with acetone to obtain a mixture of the saponins and sugars, and finally fractional crystallization of the mixture from menthanol to separate the saponins from the sugars.

Instead of using ficaria root as the starting material, a powder obtained by drying ficaria tubers and stabilizing them with alcohol vapor can also be used.

The saponins obtained by the foregoing extraction process are well-defined products which can be distinguished and quantitatively estimated, and form the active principle according to the invention, which can be administered in various forms depending on the treatment for which it is intended, and more particularly in the form of an ointment for the treatment of hemorrhoids and rosacea.

The invention will now be described in greater detail with reference to one embodiment of the process and the results of pharmacological study and clinical assessment of the ointment for the treatment of hemorrhoids, this being one of the most important applications of the invention.

EXAMPLE

The process comprises into three stages:

1. Extraction

The first step of this stage is the preparation of the starting material from the ficaria tubers.

A dry powder obtained from ficaria tubers is extracted, and the preparation of this powder requires certain precautions because of the tendency of the sugars contained in the tubers to ferment. To this end, after washing and drying, the tubers are stabilized by means of ethanol vapor for 15–30 minutes. Drying is then carried out until the water content is less than about 10 percent.

The tubers, thus stabilized and dried, are ground into powder without difficulty, although this would not be the case if they had fermented to produce a resinous mass.

This powder is then extracted with a hydroxyl-group-containing solvent, such as water or a lower alcohol, for example methanol or ethanol. The advantages of using alcohols instead of water is mainly that the solvent is more easily vaporated after extraction because saponins foam only very slightly in alcohol solution.

In one particular method of operation 10 kg. of stabilized dry powder is extracted with 15 to 18 liters of 95 percent ethanol in a continuous extractor for approximately 12 hours with boiling. The alcoholic extract is filtered to eliminate vegetable residues and resin polymers which form. It is then evaporated to dryness under reduced pressure at 45°–50° C. This gives a yellowish powder which is fairly hygroscopic because of its sugar content.

2. Separation of the saponins

This dry residue is treated with successive solvents to eliminate various impurities.

Firstly, to eliminate polymerized resins and a small quantity of chlorophyll, the above powder is boiled with a hydrocarbon solvent for about 1 hour. The hydrocarbon solvent used is preferably benzene. The insoluble fraction is separated from the solvent and is dried at a temperature below 100° C.

Secondly, in order to collect a mixture containing only saponins and sugars, the above residue is boiled with acetone and the insoluble part is separated after cooling, this insoluble part containing the above-mentioned mixture. The amount of acetone and the treatment time can be varied within certain limits. For example, 200 g. of powder can be boiled for 2 hours with 1 liter of acetone and then the resultant insoluble fraction can be retreated with 2 liters and then 0.5 liter of acetone. One hundred and thirty-five of an acetone-insoluble fraction made up of the saponins and sugars, more particularly saccharose are finally obtained.

3. Preparation of the saponins in the pure state

The sugars are separated from the saponins by fractional crystallization based on the different solubility of saponins and sugars in methanol. To this end, according to one specific method, the 135 g. of the saponin and sugar mixture as obtained above are boiled with 2 liters of methanol. Cooling of this solution produces a crystalline precipitate which consists mainly of saccharose. After several filtrations and recrystallizations, the saponins are obtained by a final recrystallization from dilute ethanol. In the case in question, an average of 18 g. of pure saponins were obtained per kg. of fresh ficaria tubers.

The resultant saponins are glucosides of sterols or triterpenes, which can therefore be distinguished and quantitatively estimated for the preparation of specific forms of administration.

The saponins have the advantage of being very stable so that for this estimation, which is carried out by acid hydrolysis which gives rise to a genin or aglycone, heating with a strongly acid medium, for example water containing 5 percent of sulfuric acid, on a boiling water bath for 1 hour must be used. A precipitate forms which is made up of genins which are soluble in chloroform. After washing and evaporation, a chloroform extract of this kind leaves a residue which can be recrystalized from dilute alcohol and which gives an intensive reaction to Liebermann's reagent (violet red coloration).

The aqueous solution from which the genins have been eliminated by extraction with chloroform, and which has been neutralized with sodium hydroxide, reduces Fehling's reagent, this being indicative of the presence of sugars.

The pharmacodynamic properties of the resultant saponins are as follows:

The technique used for a study of these properties is based on the artificial creation of considerable and lasting venous dilation by installation of xylene.

It comprises the daily intrarectal instillation into rats of 1 ml. of a 20 percent xylene solution in olive oil, which results in smaller dilatation than pure xylene but of longer duration and closer to conditions in human medicine. After complete anesthesia of the subject, anatomical and histological examinations are carried out. Macrological examination is carried out by means of a probe with a nozzle. After the major portion of the rectal mucous membrane has been sampled, sections are prepared for microscopic examination by conventional techniques. These xylene installations give an enormous venous dilation, frequently resulting in rupture and hemorrhage of the submucosa.

By way of comparison, in subjects treated with an ointment containing 23 percent of the aqueous solution of the preparation according to the invention, the venous dilation is much less marked at the end of only 2 hours than in controls, and 24 hours later the diameter of the veins has become practically normal again, whereas with the controls it takes the form of apparently irreversible lesions.

The conventional kaolin method of inflammatory edema of a rat's paw also showed that the same ointment used for direct application has a very pronounced anti-inflammatory action.

A clinical study of one particular advantageous form of administration of compositions according to the invention has been carried out with an ointment for the treatment of hemorrhoids, such ointment being administered in the form of small doses each containing 5 g. of product at the rate of one dose twice daily.

The following results were found in more than 100 cases comprising men and women from 16 to 78:

A. Subjective syndrome

In the case of burning of the anal canal, more than 70 percent of the cases resulted in complete disappearance or a distinct reduction.

In the case of anal heaviness, 95 percent of the cases were favorably influenced.

Intense anal pains were favorably relieved in 70 percent of the cases.

Hemorrhages, which are the clearest symptom of hemorrhoids, disappear in 80 percent of the cases.

B. Objective syndrome

In most cases there was a very clear improvement of the internal hemorroidal appearance as shown by anuscopy, such improvement involving mainly the congestive appearance and the fragility of the mucous membrane.

Administration of the product did not result in any rectal or general intolerance.

What is claimed is:

1. A method of treating humans afflicted with hemorrhoids or rosacea which comprises applying to the affected areas of said humans an ointment, the active ingredient of which is constituted by pure saponins produced from the root of *Ficaria ranunculus* by a process comprising the steps of subjecting a dried powder of stabilized Ficaria tubers to a first extraction by boiling same with water, methanol or ethanol, drying the extract, then boiling the thusly dried extract first with benzene and then with acetone, and finally separating from the resulting product the desired saponins by fractional crystallization from methanol followed by recrystallization from ethanol.

2. A method as claimed in claim 1 wherein the ointment contains 5 g. of pure saponins and said ointment is applied twice daily.